US012768297B2

(12) United States Patent
Stiller

(10) Patent No.: US 12,768,297 B2
(45) Date of Patent: Oct. 20, 2026

(54) INTERNAL COMBUSTION ENGINE FOR A MOTOR CAR

(71) Applicant: Mercedes-Benz Group AG, Stuttgart (DE)

(72) Inventor: Michael Stiller, Remseck (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/682,684

(22) PCT Filed: Jul. 25, 2022

(86) PCT No.: PCT/EP2022/070835
§ 371 (c)(1),
(2) Date: Feb. 9, 2024

(87) PCT Pub. No.: WO2023/016792
PCT Pub. Date: Feb. 16, 2023

(65) Prior Publication Data

US 2025/0129738 A1 Apr. 24, 2025

(30) Foreign Application Priority Data

Aug. 12, 2021 (DE) ..................... 10 2021 004 152.6

(51) Int. Cl.
*F02B 37/10* (2006.01)
*F02B 39/10* (2006.01)
(Continued)

(52) U.S. Cl.
CPC .............. *F02B 37/10* (2013.01); *F02B 39/10* (2013.01); *F02M 26/03* (2016.02); *F02M 26/04* (2016.02);
(Continued)

(58) Field of Classification Search
CPC .......... F02B 37/10; F02B 37/11; F02B 39/10; F02M 26/03; F02M 26/05; F02M 26/06;
(Continued)

(56) References Cited

U.S. PATENT DOCUMENTS

| | | | | |
|---|---|---|---|---|
| 4,171,936 A * | 10/1979 | Hageman | F02B 39/00 | 417/407 |
| 4,463,564 A * | 8/1984 | McInerney | F01N 5/04 | 137/892 |

(Continued)

FOREIGN PATENT DOCUMENTS

| | | |
|---|---|---|
| CN | 102345535 A | 2/2012 |
| CN | 108757154 A | 11/2018 |

(Continued)

OTHER PUBLICATIONS

International Search Report (PCT/ISA/210) issued in PCT Application No. PCT/EP2022/070835 dated Oct. 28, 2022 (2 pages).

(Continued)

*Primary Examiner* — Patrick D Maines
(74) *Attorney, Agent, or Firm* — Crowell & Moring LLP

(57) ABSTRACT

An internal combustion engine for a motor car has an exhaust tract which can be flowed through by exhaust gas of the internal combustion engine, a turbine wheel arranged in the exhaust tract and driven by the exhaust gas, and an exhaust gas recirculation device which has an exhaust gas recirculation conduit via which at least a part of the exhaust gas can be branched off from the exhaust tract at a branching point arranged upstream of the turbine wheel and can be recirculated to a suction tract which can be flowed through by air of the internal combustion engine and can be introduced into the suction tract at an introduction point. A compressor wheel which can be driven via electricity to compress the air flowing through the suction tract is
(Continued)

arranged in the suction tract upstream or downstream of the introduction point.

2 Claims, 5 Drawing Sheets

(51) Int. Cl.

| | |
|---|---|
| ***F02M 26/03*** | (2016.01) |
| ***F02M 26/04*** | (2016.01) |
| ***F02M 26/05*** | (2016.01) |
| ***F02M 26/06*** | (2016.01) |
| ***F02M 26/09*** | (2016.01) |
| ***F02M 26/16*** | (2016.01) |
| ***F02M 26/70*** | (2016.01) |
| *F02B 37/11* | (2006.01) |
| *F02M 26/00* | (2016.01) |

(52) U.S. Cl.
CPC ............ *F02M 26/05* (2016.02); *F02M 26/06* (2016.02); *F02M 26/09* (2016.02); *F02M 26/16* (2016.02); *F02M 26/70* (2016.02); *F02B 37/11* (2013.01); *F02M 2026/001* (2016.02)

(58) Field of Classification Search
CPC ........ F02M 26/09; F02M 26/16; F02M 26/70; F02M 2026/001
See application file for complete search history.

(56) References Cited

U.S. PATENT DOCUMENTS

| | | | | |
|---|---|---|---|---|
| 6,145,313 | A * | 11/2000 | Arnold | F02B 37/00 60/605.2 |
| 6,430,929 | B2 * | 8/2002 | Martin | F02M 26/16 251/123 |
| 10,677,140 | B1 | 6/2020 | Kaczmar et al. | |
| 2011/0162626 | A1 | 7/2011 | Styles et al. | |
| 2012/0137679 | A1 * | 6/2012 | Rolando | F02M 26/34 60/605.2 |
| 2013/0195628 | A1 * | 8/2013 | Keefover | F02M 26/06 415/146 |
| 2016/0230648 | A1 * | 8/2016 | Sanchez Perez | F02B 37/14 |
| 2018/0156164 | A1 * | 6/2018 | Keating | F02M 26/04 |
| 2018/0266344 | A1 | 9/2018 | Moriyasu et al. | |

FOREIGN PATENT DOCUMENTS

| | | | |
|---|---|---|---|
| DE | 10 2015 015 794 | A1 | 8/2016 |
| DE | 102018006413 | A1 * | 2/2020 |
| DE | 10 2019 001 378 | A1 | 8/2020 |
| DE | 10 2019 003 576 | A1 | 11/2020 |
| GB | 2590942 | A | 7/2021 |
| JP | 2003-519309 | A | 6/2003 |
| JP | 2011-163308 | A | 8/2011 |
| JP | 2019-105267 | A | 6/2019 |
| SE | 517 599 | C2 | 6/2002 |
| WO | WO 01/14707 | A1 | 3/2001 |

OTHER PUBLICATIONS

Japanese-language Office Action issued in Japanese Application No. 2024-508023 dated Jan. 21, 2025 (6 pages).
German-language European Office Action issued in European Application No. 22 757 271.6 dated Aug. 11, 2025 (5 pages).
Chinese-language Office Action issued in Chinese Application No. 202280055449.0 dated Mar. 31, 2026 (7 pages).

* cited by examiner

INTERNAL COMBUSTION ENGINE FOR A MOTOR CAR

BACKGROUND AND SUMMARY OF THE INVENTION

The invention relates to an internal combustion engine for a motor car.

Such an internal combustion engine for a motor car can for example be taken as known from DE 10 2018 006 413 A1. The internal combustion engine has an exhaust tract which can be flowed through by exhaust gas of the internal combustion engine and a turbine wheel arranged in the exhaust tract and driven by the exhaust gas, which can for example be a component of an exhaust gas turbocharger. An exhaust gas recirculation device is further provided, which has an exhaust gas recirculation conduit, by means of which at least a part of the exhaust gas flowing through the exhaust gas tract can be branched off at a branching point arranged upstream of the turbine wheel and can be returned to a suction tract, which can be flowed through by air, of the internal combustion engine and can be introduced into the suction tract, and thus into the air flowing through the suction tract at an introduction point.

GB 2590942 A further discloses an air intake system for an internal combustion engine. An exhaust gas guide valve having a plurality of ports should be taken as known from U.S. Pat. No. 10,677,140 B1. An internal combustion engine for a motor car is further known from DE 10 2018 006 413 A1. DE 10 2015 015 794 A1 discloses a method for heating at least one exhaust gas post-treatment device arranged in an exhaust tract of a motor vehicle comprising an internal combustion engine and able to be driven by means of the internal combustion engine. A method for operating an internal combustion engine for a motor car is further known from DE 10 2019 003 576 A1.

The object of the present invention is to develop an internal combustion engine of the kind specified in the introduction such that a particularly low-emission operation can be implemented.

In order to develop an internal combustion engine, designed in particular as a diesel motor, of the kind specified herein such that a particularly low-emission operation of the internal combustion engine can be implemented, it is provided according to the invention that a compressor wheel which can be driven via electricity to compress the air flowing through the suction tract is arranged in the suction tract upstream or downstream of the introduction point. This means that the compressor wheel is a component of an electric compressor, i.e., a compressor which can be operated via electricity, wherein the compressor has the compressor wheel and an electric engine, by means of which the compressor wheel can be driven by electricity to compress the air. The compression of the air is also described as charging. Because the compressor wheel can be driven via electricity, charging supported via electricity is implemented. Due to the electrically supported charging, a driving scavenging pressure difference, in particular between the branching point and the introduction point can be reduced in comparison with conventional solutions, wherein the scavenging pressure difference is used to recirculate the exhaust gas. The recirculation of the exhaust gas is also described as exhaust gas recirculation, which can be carried out particularly advantageously in the invention. The following facts and considerations are in particular the basis of the invention: Turbocharging has established itself as a way to increase the specific power and to reduce emissions and consumption of internal combustion engines. A turbomachine, in particular designed as an exhaust gas turbocharger or functioning or able to be operated as an exhaust gas turbocharger, is provided, of which the mass inertia leads to a delayed build-up of boost pressure in a dynamic operation. In the load jump at low engine rotational speeds, for example when rotation speeds remain constant, in particular in the starting process from idling, the exhaust gas turbocharger has a low rotational speed, or boost pressure. This means that when maximum torque is required, the maximum moment is not released instantly from an initial state, and instead only the injection quantity or the moment up to the minimum lambda is released. The torque build-up follows the boost pressure, which depends in turn on the turbine size, the efficacy, the mass inertia, the enthalpy offer and the exhaust gas recirculation rate. As soon as the steady boost pressure is reached, the smoke operation or the insufficient air operation is ended. In these uses as a motor, a compromise in the dynamic torque build up and the exhaust gas recirculation rate, i.e., nitrogen oxide formation, must be found, because the exhaust gas recirculation reduces the fresh air mass flow, and thus increases the boost pressure requirement and reduces the energy available to the turbine. The highest activation level occurs after a cold start until the nitrogen oxide purification by means of SCR (selective catalytic reduction) is at operating temperature. The nitrogen oxide purification is effective from about 160 degrees Celsius to 180 degrees Celsius with increasing efficacy until approx. 240 to 270 degrees Celsius. The EGR rate can thus be reduced or the nitrogen oxide raw emissions can be increased in order to generate less soot in relation to a conflict of objectives between nitrogen oxide/soot emissions, and thus to lengthen a regeneration interval for regeneration of a particle filter, for example designed as a diesel particle filter (DPF), and to improve the ageing of the exhaust gas purification and the dynamic power delivery. Technologies with faster boost pressure build-up are expedient for improving the specified conflict of objectives. The technologies can differ from one another depending on their type of energy source:

- smaller VTG turbine with higher efficacy in the region of lower flow quantities,
- turbine with lower mass inertia, for example ceramics or TiAI,
- mechanical additional compressor,
- pressurized air injection or air injection in front of the turbine,
- electric additional compressor,
- electric turbocharger.

In the event of a load jump while rotation speed remains constant, a correlation arises for a diesel motor application, in which the nitrogen oxide emissions fall until the maximum torque is reached. In a corresponding evaluation, the time to reach a particular torque or the accomplished work, i.e., the integral of the positive power is plotted. In a similar manner, the nitrogen oxide mass flow (NOx mass flow) is integrated. By varying the EGR rate, different x and y value pairs result, and a curve can be formed which depicts the previously specified correlation, and in particular the course of nitrogen oxide emissions over time up to the moment of or beyond the work accomplished. By adding an electric compressor or an electric turbocharger, in particular in a load current with a constant rotational speed, a significantly faster boost pressure build-up results due to brief electrical support, but without adjusting the application, so does a significantly increased nitrogen oxide flow. Adjusting the application leads to improvements with regard to the nitrogen oxide emissions, the boost pressure and the torque build-up. It has been found that a smaller, more powerful turbine leads to a slight improvement in a conflict of objectives between nitrogen oxide emissions and advantageous dynamics. A significant improvement can be implemented by using an electric turbocharger or an electric compressor. The kind of electric support affects the driving scavenging pressure difference from the branching point to the introduction point of the exhaust gas recirculation device for example designed as a high-pressure exhaust gas recirculation device or designed to carry out a high-pressure exhaust gas recirculation. Using an electric compressor wheel, for example in an electric turbocharger or in an electric additional compressor, makes it possible to increase a pressure also described as suction pipe pressure and present in the suction tract without a pressure present in the exhaust tract upstream of the turbine wheel also increasing. The driving scavenging pressure difference thus falls from the branching point to the introduction point, regardless of the starting level, whereby no exhaust gas can be recirculated. No further improvement of the nitrogen oxide emissions results despite the possibility of building up the boost pressure more quickly.

It is additionally provided that the exhaust gas recirculation device has an exhaust gas recirculation valve, by means of which a quantity of the exhaust gas flowing through the exhaust gas recirculation conduit can be adjusted. The turbine wheel is arranged in a turbine housing which can be flowed through by exhaust gas and can be rotated relative to the turbine housing, wherein the exhaust gas recirculation valve is also arranged in the turbine housing and can be moved relative to the turbine housing to adjust the quantity, or an exhaust manifold is arranged in the exhaust tract, in which exhaust manifold the exhaust gas can be collected from several combustion chambers of the internal combustion engine, wherein the exhaust gas recirculation valve is arranged in the exhaust manifold and can be moved relative to the exhaust manifold to adjust the quantity.

Further advantages, features and details of the invention result from the following description of preferred exemplary embodiments and with reference to the drawings. The features and combinations of features previously specified in the description and the features and combinations of features specified in the following description of figures and/or shown only in the figures can be used not only in the specified combination, but also in other combinations or in isolation, without leaving the scope of the invention.

DETAILED DESCRIPTION OF THE DRAWINGS

Figure 1:
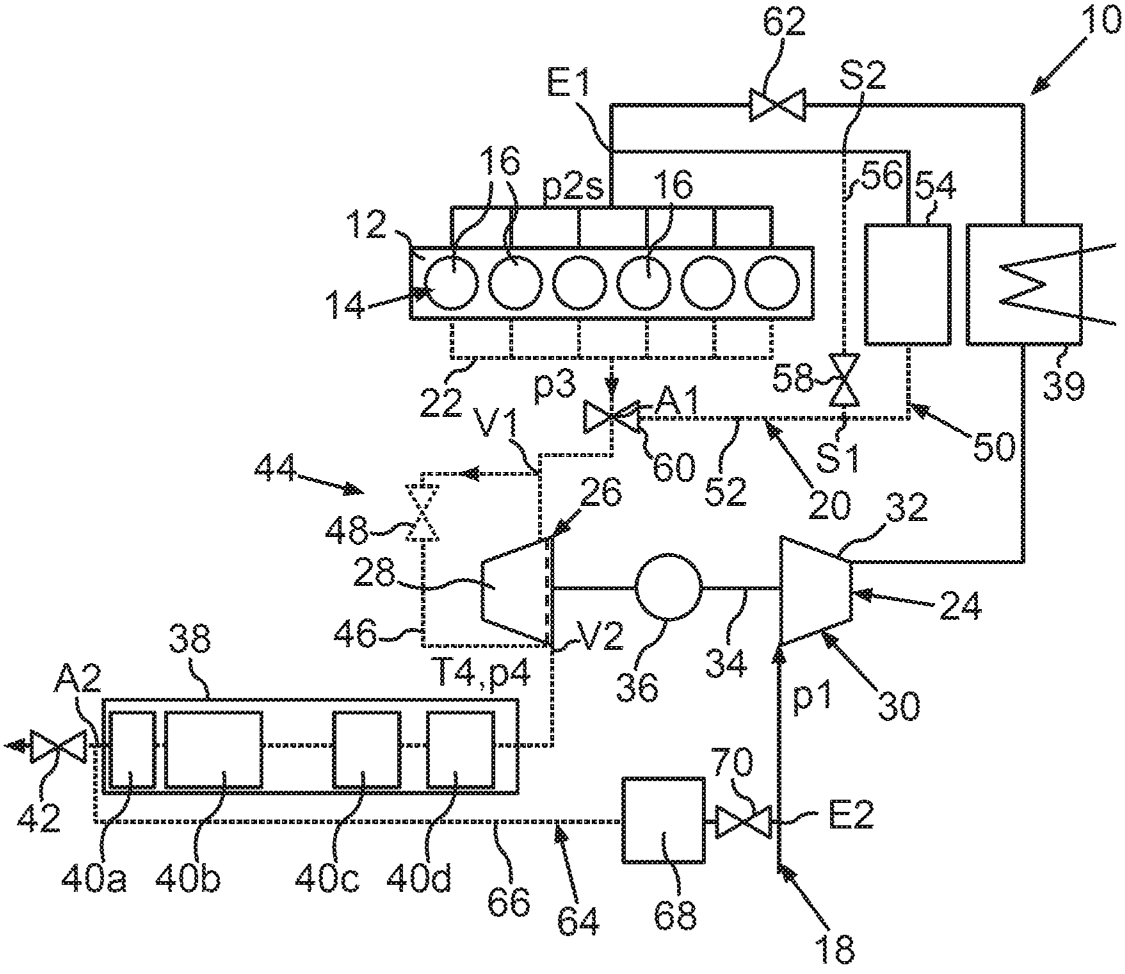
FIG. 1 shows a schematic depiction of a first embodiment of an internal combustion engine for a motor car.

In the Figures, identical or functionally identical elements are provided with identical reference numerals.

FIG. 1 shows a first embodiment of an internal combustion engine 10 for a motor car in a schematic depiction. The internal combustion engine 10 is preferably designed as a diesel engine. The internal combustion engine 10 has an engine block 12 with several cylinders 14, wherein the respective cylinder 14 forms or delimits a respective combustion chamber 16 of the internal combustion engine 10. The internal combustion engine 10 has a suction tract 18 which can be flowed through by air and is also described as an intake tract, by means of which the air flowing through the suction tract 18 is fed to and into the combustion chambers 16. The internal combustion engine 10 further has an exhaust tract 20 which can be flowed through by exhaust gas from the combustion chambers 16, in which suction tract an exhaust manifold 22, also simply described as a manifold, is arranged. By means of the exhaust manifold 22, the exhaust gas is collected from the several combustion chambers 16, in particular from all combustion chambers of the internal combustion engine 10. The internal combustion engine 10 has an exhaust gas turbocharger 24, which has a turbine 26 arranged in the exhaust tract 20, having a turbine wheel 28. The turbine wheel 28 can be driven by the exhaust gas flowing through the exhaust tract 20. The exhaust gas turbocharger 24 additionally comprises a compressor 30 arranged in the suction tract 18, having a compressor wheel 32, by means of which the air flowing through the suction tract 18 can be compressed by driving the compressor wheel 32. The compressor wheel 32 can be driven by the turbine wheel 28 via a shaft 34 of the exhaust gas turbocharger 24. In the first embodiment, the exhaust gas turbocharger 24 has an electric engine 36, by means of which at least the compressor wheel 32 can be driven via electricity. The exhaust gas turbocharger 24 is thus designed as an electric exhaust gas turbocharger, i.e., as an electric exhaust gas turbocharger. A pressure present in the suction tract 18 upstream of the compressor wheel 32 is labelled p1. An intercooler 39 is arranged in the suction tract 18 downstream of the compressor wheel 32 and upstream of the combustion chambers 16, by means of which the compressed air is cooled. A pressure of the air present in the suction tract 18 downstream of the intercooler 39 and upstream of the combustion chambers 16 is labelled p2*s*, wherein the air p2*s* is also described as boost pressure, at which pressure for example the air can be compressed by means of the compressor wheel 32. A pressure present in the exhaust tract 20 downstream of the combustion chambers 16 and upstream of the turbine wheel 28 is labelled p3.

In the exhaust tract 20, an exhaust gas post-treatment device 38 is arranged, which can be flowed through by the exhaust gas. The exhaust gas is post-treated by means of the exhaust gas post-treatment device 38. A pressure present in the exhaust tract 20 downstream of the turbine wheel 28 and upstream of the exhaust gas post-treatment device 38 is labelled p4. A temperature of the exhaust gas in the exhaust gas tract 20, also described as exhaust gas temperature, is labelled T4, wherein the exhaust gas has the temperature T4 downstream of the turbine wheel 28 and upstream of the exhaust gas post-treatment device 38. The exhaust gas post-treatment device 38 has exhaust gas post-treatment elements 40*a-d*, wherein the exhaust gas post-treatment element 40*d* is arranged downstream of the turbine wheel 38 and upstream of the exhaust gas post-treatment element 40*c*. The exhaust gas post-treatment element 40*c* is arranged downstream of the exhaust gas post-treatment element 40*d* and upstream of the exhaust gas post-treatment element 40*b*, and the exhaust gas post-treatment element 40*b* is arranged upstream of the exhaust gas post-treatment element 40*c* and upstream of the exhaust gas post-treatment element 40*a*. The exhaust gas post-treatment element 40*d* is for example an oxidation catalyst, in particular a diesel oxidation catalyst (DOC). The exhaust gas post-treatment element 40*c* for example comprises a particle filter, in particular a diesel particle filter (DPF). As an alternative or in addition, the exhaust gas post-treatment element 40*c* can have an SCR catalyst. In particular, the exhaust gas post-treatment element 40*c* can have a catalytically effective coating for the selective catalytic reduction (SCR) for denitrifying the exhaust gas, with which coating the particle filter, in particular diesel particle filter, can for example be provided. The exhaust gas post-treatment element 40*b* is for example an, in particular second, SCR catalyst. The exhaust gas post-treatment element 40*a* is for example an ammonia slip catalyst (ASC).

In the first embodiment, an exhaust flap 42 is arranged in the exhaust tract 20 downstream of the exhaust gas post-treatment device 38 and thus downstream of the turbine wheel 28, by means of which exhaust flap the exhaust gas in the exhaust tract 18 can be dammed. For example, the exhaust flap 42 is arranged in a conduit element of the exhaust tract 20, and can be moved, in particular pivoted, relative to the conduit element between two different positions. Via the exhaust flap 42, in a first position, at least one partial region of a flow cross-section of the exhaust tract 20 which can be flowed through by the exhaust gas is blocked by means of the exhaust flap 42, such that no more exhaust gas can flow through the partial region. In the second position, the exhaust flap 42 for example releases the partial region.

A bypass device 44 is assigned to the turbine 26, in particular to the turbine wheel 28. The bypass device 44 comprises a bypass conduit 46, which is also described as a bypass line or waste gate conduit. The bypass conduit 46 is fluidically connected to the exhaust tract 20 at connection points V1 and V2, the connection point V1 is arranged upstream of the turbine wheel 28, and the connection point V2 is arranged downstream of the turbine wheel 28, and in particular upstream of the exhaust gas post-treatment device 38. By means of the bypass conduit 46, at least a part of the exhaust gas flowing through the exhaust tract 20 can be branched off from the exhaust tract 20 and introduced into the bypass conduit 46. The branched-off exhaust gas can flow through the bypass conduit 46, and is fed to the connection point V2 by means of the bypass conduit 46, at which connection point V2 the exhaust gas flowing through the bypass conduit 46 can flow out of the bypass conduit 46 and back into the exhaust tract 20. The exhaust gas flowing through the bypass conduit 46 bypasses the turbine wheel 28, such that the turbine wheel 28 is not driven by the exhaust gas flowing through the bypass conduit 46. The bypass device 44 additionally comprises a valve element 48, also described as a waste gate or waste gate valve or bypass valve, by means of which a quantity of the exhaust gas flowing through the bypass conduit 46 can be adjusted. By adjusting the quantity of the exhaust gas flowing through the bypass conduit 46, a power of the turbines 26, also described as a turbine power, and thus the boost pressure (pressure p2*s*), can be adjusted.

The internal combustion engine 10 has a first exhaust gas recirculation device 50, by means of which an exhaust gas recirculation designed as a high-pressure exhaust gas recirculation can be carried out. The exhaust gas recirculation device 50 is thus designed as a high-pressure exhaust gas recirculation device. The exhaust gas recirculation device 50 comprises a recirculation conduit 52, which is also described as an exhaust gas recirculation conduit. The recirculation conduit 52 is fluidically connected to the exhaust tract 20 at a branching point A1 and fluidically connected to the suction tract 18 at an introduction point E1, such that at least a part of the exhaust gas flowing through the exhaust gas recirculation device 50 can be branched off from the exhaust tract 20 and introduced into the recirculation conduit 52 at the branching point A1 by means of the recirculation conduit 52. The exhaust gas which has been branched off and introduced into the recirculation conduit 52 can flow through the recirculation conduit 52, and is guided to the introduction point E1 by means of the recirculation conduit 52. The exhaust gas flowing through the recirculation conduit 52 can flow out of the recirculation conduit 52 at the introduction point E1 and then flow into the suction tract 18, whereby the exhaust gas flowing through the recirculation conduit 52 is introduced into the suction tract 18 at the introduction point E1, and thus into the air flowing through the suction tract 18. In the first embodiment, the exhaust gas recirculation device 50 is designed as a cooled and uncooled exhaust gas recirculation device. This should in particular be understood to mean the following: An exhaust gas recirculation cooler 54 is arranged in the recirculation conduit 52, by means of which exhaust gas recirculation cooler at least a part of the exhaust gas flowing through the recirculation conduit 52 can be cooled. The exhaust gas recirculation device 50 further has a further bypass conduit 56, which is fluidically connected to the recirculation conduit 52 at the points S1 and S2. The point S1 is arranged in the recirculation conduit 52 upstream of the exhaust gas recirculation cooler 54, and the point S2 is arranged in the recirculation conduit 52 downstream of the exhaust gas recirculation cooler 54 and upstream of the introduction point E1. By means of the further bypass conduit 56, at least a part of the exhaust gas flowing through the recirculation conduit 52 can be branched off from the recirculation conduit 52 at the point S1 and introduced into the further bypass conduit 56. The exhaust gas introduced into the further bypass conduit 56 flows through the further bypass conduit 56, and is fed to the point S2 by means of the further bypass conduit 56. The exhaust gas flowing through the further bypass conduit 56 can flow out of the further bypass conduit 56 and into the recirculation conduit 52 at the location S2. The exhaust gas flowing through the further bypass conduit 56 bypasses the exhaust gas recirculation cooler 54. This means that the exhaust gas flowing through the further bypass conduit 56 does not flow through the exhaust gas recirculation cooler 54, and thus is not cooled by means of the exhaust gas recirculation cooler 54, and instead remains uncooled. A valve element 58 is arranged in the further bypass conduit 56, by means of which a quantity of the exhaust gas flowing through the further bypass conduit 56 can be adjusted.

The exhaust gas recirculation device 50 additionally comprises an exhaust gas recirculation valve 60, by means of which a quantity of the exhaust gas flowing through the recirculation conduit 52, i.e., a quantity of the exhaust gas can be adjusted, which is branched off from the exhaust tract 20 at the branching point A1 by means of the recirculation conduit 52. A throttle flap 62 is arranged in the suction tract 18, in particular downstream of the intercooler 39 and upstream of the combustion chambers 16, in particular upstream of the introduction point E1, by means of which throttle flap a quantity of the air flowing through the suction tract 18 to be fed to the combustion chambers 16 can be adjusted.

The internal combustion engine 10 further has a second exhaust gas recirculation device 64, which is designed as a low pressure exhaust gas recirculation device. This means that an exhaust gas recirculation designed as a low pressure exhaust gas recirculation can be carried out by means of the second exhaust gas recirculation device 64. For this purpose, the exhaust gas recirculation device 64 comprises a second recirculation conduit 66, which is also described as a second exhaust gas recirculation conduit. The second recirculation conduit 66 is fluidically connected to the exhaust tract 20 at a second branching point A2 and fluidically connected to the suction tract 18 at a second introduction point E2. By means of the second recirculation conduit 66, at least a part of the exhaust gas flowing through the exhaust tract 20 can be branched off from the exhaust tract at the second branching point A2 and introduced into the second recirculation conduit 66. The exhaust gas which has been branched off at the branching point A2 and introduced into the second recirculation conduit 66 can flow through the second recirculation conduit 66, and is guided to the introduction point E2 by means of the second recirculation conduit 66. The exhaust gas flowing through the recirculation conduit 66 can flow out of the recirculation conduit 66 at the introduction point E2 and flow into the suction tract 18, such that the exhaust gas flowing through the recirculation conduit 66 can be or is introduced into the suction tract 18 at the introduction point E2, and thus into the air flowing through the suction tract 18. It can be seen from FIG. 1 that the introduction point E2 is arranged upstream of the compressor wheel 32 in the suction tract 18. The branching point A2 is arranged downstream of the turbine wheel 28, in particular downstream of the exhaust gas post-treatment device 38, and upstream of the exhaust flap 42 in the exhaust tract 20. It can additionally be seen that the branching point A1 is arranged upstream of the turbine wheel 28 in the exhaust tract 20.

The second exhaust gas recirculation device 64 can have an in particular second exhaust gas recirculation cooler 68, which is arranged in the second recirculation conduit 66. By means of the exhaust gas recirculation cooler 68, the exhaust gas flowing to the recirculation conduit 66 can be cooled. The second exhaust gas recirculation device 64 further for example has a second exhaust gas recirculation valve 70, which is arranged in the second recirculation conduit 66. By means of the exhaust gas recirculation valve 70, a quantity of the exhaust gas flowing through the recirculation conduit 66, i.e., a quantity of the exhaust gas can be adjusted, which is branched off from the exhaust tract 20 at the branching point A2 by means of the recirculation conduit 66, and introduced into the recirculation conduit 66.

By using the exhaust gas turbocharger 24 designed as an electric turbocharger, more power can be fed into the compressor 30 via electrical support. The EGR driving scavenging pressure difference from the branching point A1 to the introduction point E1, and thus from p3 to p2*s* is reduced. In the present case, it is for example assumed that the EGR rate is insufficient and the turbine 26, in particular with regard to the waste gate and/or a variable turbine geometry (VTG) of the turbine 26 is matched for the dynamics or the EGR requirement as best as possible. By closing the throttle flap 62 also described as a suction throttle flap, a pressure also described as suction pipe pressure and present in the suction tract 18, in particular downstream of the intercooler 39 38, e.g., the pressure p2*s*, can be reduced. The electrically generated additional boost pressure must be artificially throttled away. In addition, the absorption line in the compressor 30 moves closer to the pump limit. The exhaust flap 42 represents a further possibility of increasing the driving EGR pressure difference. This allows an increased scavenging pressure difference without feedback to the compressor 30. The turbine output is reduced by the increased pressure p4 in particular at least substantially in proportion with p3/p4. This is compensated for by the electric turbocharger.

In addition to a high-pressure EGR path from p3 to p2 in the form of the exhaust gas recirculation device 50, the internal combustion engine 10 shown in FIG. 1, which is also simply described as a motor or combustion motor, also has a low-pressure EGR path from the ambient pressure to p1 in the form of the exhaust gas recirculation device 64, presently having the exhaust flap 42, by means of which, for example, the pressure difference of the ambient pressure from p1 can be actively influenced, in particular adjusted. The low-pressure EGR path is thus an additional low-pressure EGR path, which enables a faster boost pressure build-up, because the complete EGR mass flow is used via the turbine 26. This advantage can be easily compensated for using the electric turbocharger, such that the low-pressure EGR path or the low-pressure exhaust gas recirculation is not necessarily required as a nitrogen oxide and dynamics measure. In addition, the low-pressure exhaust gas recirculation is not necessarily available at very cold temperatures, in particular due to condensation and ice formation.

With the omission of the low-pressure EGR path (exhaust gas recirculation device 64), the exhaust flap 42 can also be made available. For this reason or then, the exhaust gas turbocharger 24 in particular designed as an electric turbocharger is for example suggested or equipped with an exhaust gas recirculation valve, as is for example in the exhaust gas recirculation valve 60, which is shown for example in FIG. 2. A section of an exhaust gas guide element which can be flowed through by the exhaust gas flowing through the exhaust gas tract 20 can be seen in FIG. 2, and labelled 72. The exhaust gas guide element 72 is for example a turbine housing, in which the turbine wheel 28 is rotatably arranged. The exhaust gas guide element 72 can for example be an exhaust gas guide element which can be arranged in the exhaust tract 20 upstream of the turbine wheel 28, and in particular upstream of the turbine housing, and thus outside of the turbine housing.

Figure 2:
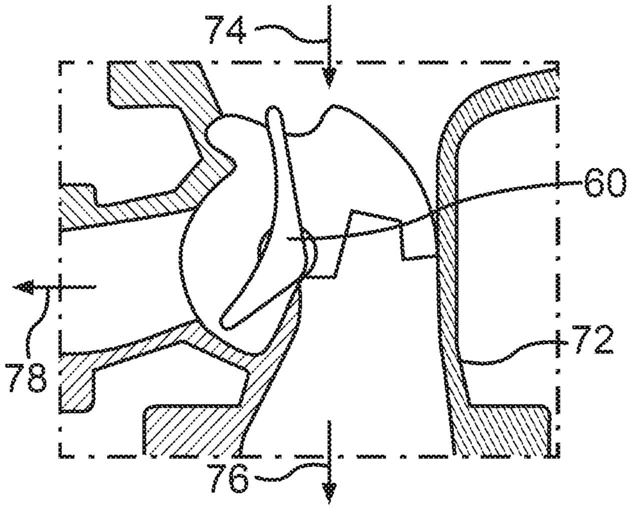
FIG. 2 shows a section of a schematic sectional view of the internal combustion engine.

In FIG. 2, a total flow of the exhaust gas is depicted by an arrow 74. The exhaust gas flowing towards and thus driving the turbine wheel 28 is depicted in FIG. 2 by a part 76, and an arrow 78 depicts the exhaust gas, which is branched off from the exhaust tract 20 at the branching point A1 upstream of the turbine wheel 28 by means of the recirculation conduit 52, and thus does not drive the turbine wheel 28. In this advantageous construction, the exhaust gas recirculation valve 60 is a flap which is for example pivoted in the main exhaust gas flow to the turbine wheel 28. An in particular necessary exhaust gas recirculation is thus forced. In borderline cases, it is conceivable that the path from the manifold into the turbine 26 is completely closed, and the complete exhaust gas mass flow is pressed to the suction side, and is thus recirculated. An EGR rate of 100 percent would thus be possible.

Figure 3:
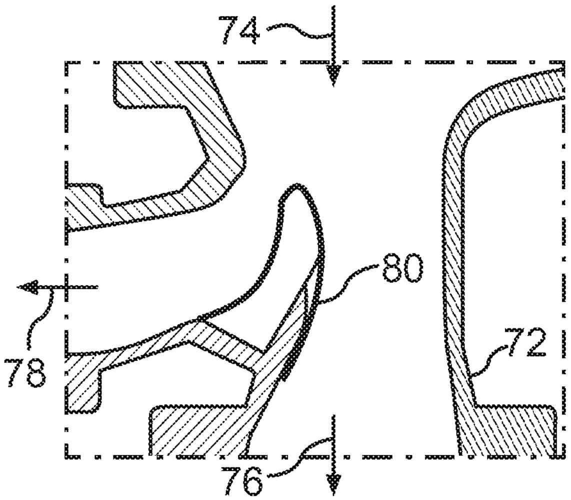
FIG. 3 shows a section of a schematic sectional view of a second embodiment of the internal combustion engine.

FIG. 3 shows a section of second embodiment of the internal combustion engine 10. The exhaust gas guide element 72 can for example be the exhaust manifold 22, such that it is conceivable, in particular with regard to FIG. 2, that the exhaust gas recirculation valve 60 is arranged in the exhaust manifold 22, and can be moved, in particular pivoted, relative to the exhaust manifold 22 to adjust the quantity of the exhaust gas to be recirculated. By contrast, in the second embodiment shown in FIG. 3, a fixed diverter switch 80, which thus cannot be moved relative to the exhaust gas guide element 72 (exhaust manifold 22) is provided in the exhaust gas guide element 72, in particular in the exhaust manifold 22, and by means of which the total flow of the exhaust gas depicted by the arrow 74 is divided into the turbine flow (arrow 76) and the EGR flow (arrow 78).

Figure 4:
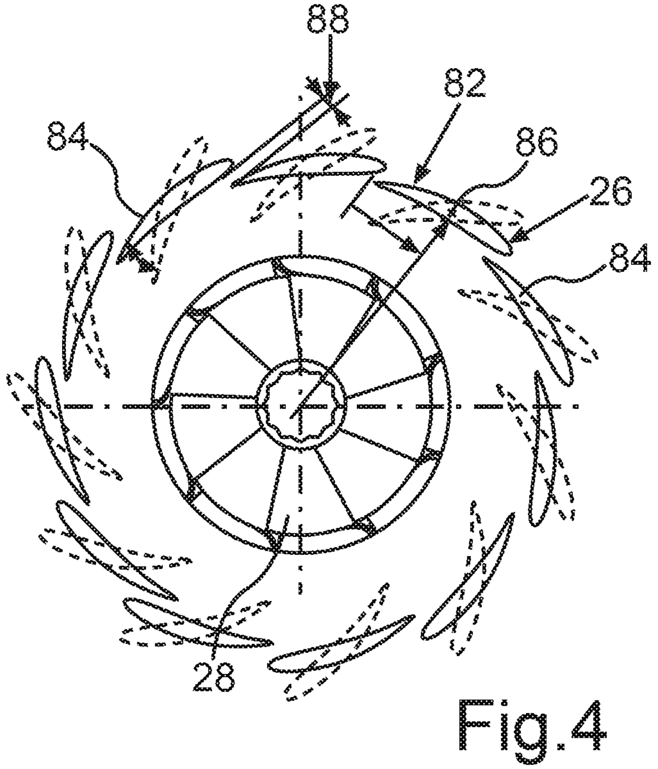
FIG. 4 shows a section of a schematic front view of a turbine for the internal combustion engine.

FIG. 1 shows the turbine 26 with the turbine wheel 28 in a schematic front view. It can be seen from FIG. 4 that the turbine 26 can have a variable turbine geometry (VTG) 82. The variable turbine geometry 82 comprises guide vanes 84 which can be moved, in particular pivoted, relative to the turbine housing and by means of which, for example, a flow cross-section which can be flowed through by the exhaust gas flowing towards the turbine wheel 28 can be varied, in particular in the turbine housing. In FIG. 4, a centre of rotation of one of the guide vanes 84 is labelled 86. In addition, a minimum gap, through which the exhaust gas can flow, is labelled 88. The variable turbine geometry 82 is for example a strongly tight-sealing variable turbine geometry, whereby the radial minimum gap and the axial gap can be minimized, such that the throughput parameter of the turbine 26 can be further reduced. A potential efficacy disadvantage and a lower turbine power resulting from the latter are compensated for by the electric turbocharger.

Figure 5:
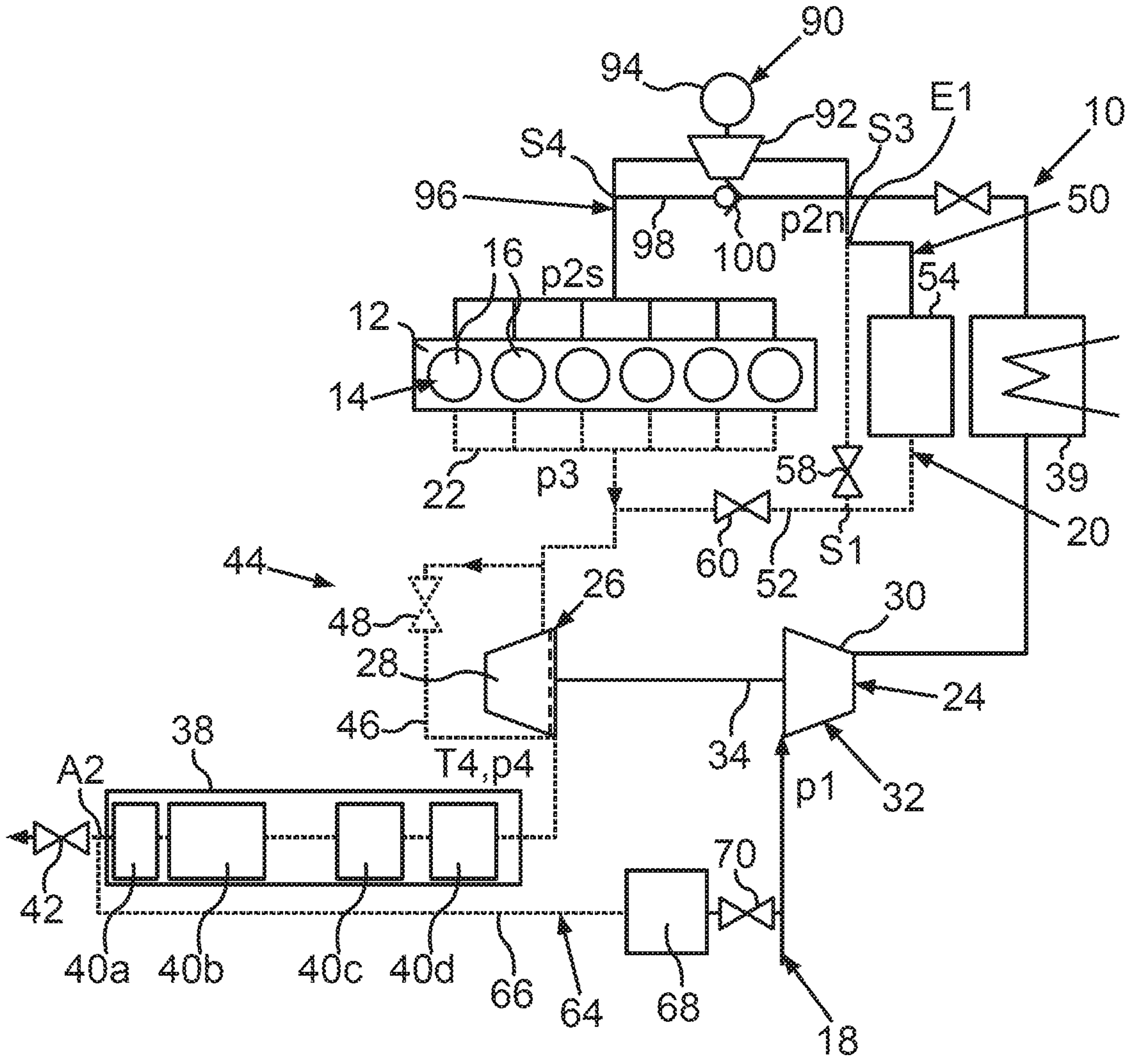
FIG. 5 shows a section of a schematic sectional view of a third embodiment of the internal combustion engine.

FIG. 5 shows a third embodiment of the internal combustion engine 10. In the third embodiment, an additional compressor 90 is arranged in the suction tract 18 in addition to the exhaust gas turbocharger 24, wherein the additional compressor 90 is an electric additional compressor. In addition, in the third embodiment, the exhaust gas turbocharger 24 is not designed as an electric exhaust gas turbocharger, such that no electric machine is provided to electrically drive the compressor wheel 32. The pressure p2*s* is present downstream of the additional compressor 90, wherein a pressure present downstream of the intercooler 39 and upstream of the additional compressor 90 in the suction tract 18 is labelled p2*n*. The additional compressor 90 has a compressor wheel 92 arranged in the suction tract 18, which is provided in addition to the compressor wheel 32. The compressor wheel 92 is arranged downstream of the compressor wheel 32 and downstream of the intercooler 39. In addition, the additional compressor 90 comprises an electric engine 94, by means of which the compressor wheel 92 can be driven. By driving the compressor wheel 92, at least a part of the air flowing through the suction tract 18 can be compressed.

A further bypass device 96 is assigned to the compressor wheel 92, which bypass device has a further bypass conduit 98. The further bypass conduit 98 is fluidically connected to the suction tract 18 at points S3 and S4. The point S3 is arranged upstream of the compressor wheel 92 and downstream of the compressor wheel 32, in particular downstream of the intercooler 39. The point S4 is arranged downstream of the compressor wheel 92 and upstream of the combustion chambers 16. By means of the bypass conduit 98, at least a part of the air flowing through the suction tract 18, and in particular compressed by means of the compressor wheel 32 can be branched off from the suction tract 18 at the point S3 and introduced into the bypass conduit 98. The air introduced into the bypass conduit 98 flows through the bypass conduit 98, and is guided to the point S4 by means of the bypass conduit 98. The air flowing through the bypass conduit 98 can be guided out of the bypass conduit 98 and introduced into the suction tract 18 at the point S4. The air flowing through the bypass conduit 98 bypasses the compressor wheel 92 and is thus not compressed by means of the compressor wheel 92.

In the third embodiment shown in FIG. 5, a valve element 100 is formed in the bypass conduit 98, which valve element can be designed as a recirculation valve according to FIG. 5, which recirculation valve blocks in the direction of the point S3 and opens in the opposite direction, and thus in the direction of the point S4, such that the valve element 100 permits a flow of the air flowing through the bypass conduit 98 from the point S3 to the point S4, but suppresses, i.e., avoids a flow of air in the bypass conduit 98 from the point S4 behind the point S3. In particular, it is provided that the compressor wheel 92 and/or the point S3 is arranged downstream of the introduction point E1, and thus downstream of the EGR introduction. This means that the high-pressure exhaust gas recirculation is introduced into the suction tract 18 after the intercooler 39 and before the electric additional compressor 90, in particular at a point at which the pressure p2*n* is present. The boost pressure increased via the electric additional compressor 90 does not reduce the driving scavenging pressure difference. The valve element 100 presently designed as a recirculation valve prevents air from flowing back from p2*s* to p2*n*. Normally, or if an error function arises, the valve element 100 opens and closes only if the pressure p2*s* is greater than the pressure p2*n*. Without controlling the electric additional compressor 90, the valve element 100 (recirculation valve) is open.

As an alternative, it is conceivable that the suction air throttle flap (throttle flap 62) replaces the function of the valve element 100 for example designed as a bypass flap. The electric additional compressor 90 additionally has the advantage that the pump limit is expanded by the additional compressor characteristic, which is an advantage in the event of high EGR rates at low rotational speeds. The additional compressor 90 is for example operated transiently during the torque build-up for a short time with EGR, and the compressed air is not cooled.

A clear improvement of the conflict of objectives with regard to nitrogen oxide and dynamics can be achieved by the described embodiments. A clear reduction of the nitrogen oxide emissions can be achieved with a comparable driving power. A further advantage of the additional compressor 90 is that it acts like a high-pressure stage and does not reduce the volume flow of the compressor 30, whereby the latter is further away from the stability limit (spark limit). Particularly high high-pressure EGR rates can be driven transiently, i.e., dynamically.

In an embodiment not depicted in the Figures, it is conceivable that the valve element 100 is designed as an active throttle flap, for example such as the throttle flap 62. A quantity of the air flowing through the bypass conduit 98, and thus bypassing the additional compressor 90, can thus for example be adjusted by means of the valve element 100. For a throttled operation, the electric additional compressor 90 should generate a sufficient reduction in pressure. This can be achieved by the stationary operation or by rotation against the flow direction.

Figure 6:
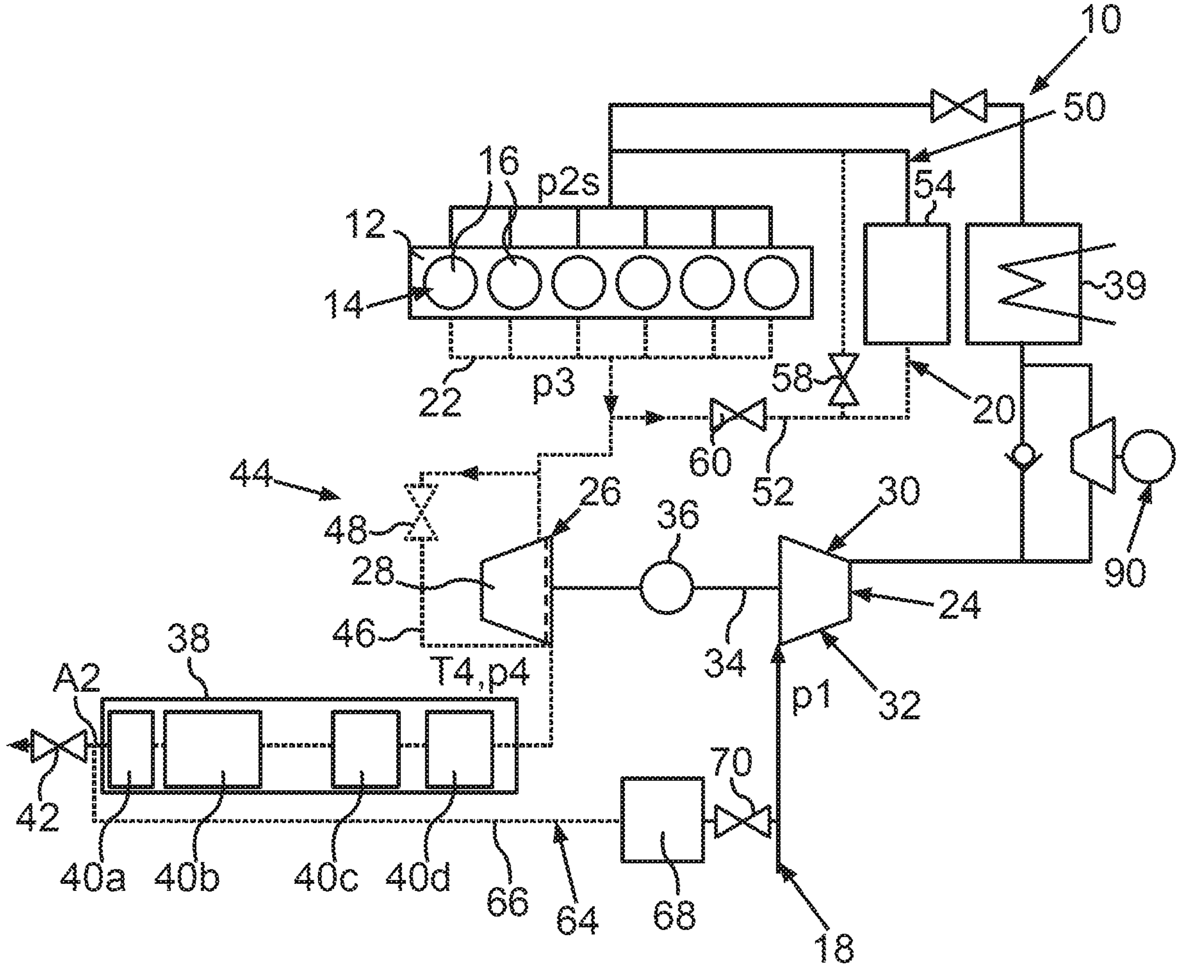
FIG. 6 shows a schematic sectional view of a fourth embodiment of the internal combustion engine.

Finally, FIG. 6 shows the internal combustion engine 10 according to a fourth embodiment. In the fourth embodiment, the electric additional compressor 90 is arranged in the suction tract 18, however downstream of the compressor wheel 32 of the compressor 30 and upstream of the intercooler 39. In the fourth embodiment, the exhaust gas turbocharger 24 is designed as an electric exhaust gas turbocharger, i.e., as an electrically supported exhaust gas turbocharger, and consequently comprises the electric engine 36.

The invention claimed is:

1. An internal combustion engine (10) for a motor car, comprising:

an exhaust tract (20) flowable through by an exhaust gas of the internal combustion engine (10);

a turbine wheel (28) disposed in the exhaust tract (20) and drivable by the exhaust gas;

an exhaust gas recirculation device (50) which has an exhaust gas recirculation conduit (52) via which at least a part of the exhaust gas is branchable off from the exhaust tract (20) at a branching point (A1) disposed upstream of the turbine wheel (28) and recirculatable to a suction tract (18) which is flowable through by air of the internal combustion engine (10) and is introducible into the suction tract (18) at an introduction point (E1);

a first compressor (30) having a first compressor wheel (32) which is drivable via electricity to compress the air flowing through the suction tract (18), wherein the first compressor (30) is disposed in the suction tract (18) upstream of the introduction point (E1);

a second compressor (90) having a second compressor wheel (92), wherein the second compressor (90) is disposed in the suction tract (18) and downstream of the first compressor (30) and wherein the exhaust gas recirculation conduit (52) is introduced upstream of the second compressor (90); and an exhaust flap (42) for damming the exhaust gas, wherein the exhaust flap (42) is disposed downstream of the turbine wheel (28) in the exhaust tract (20);

wherein the exhaust gas recirculation device (50) has an exhaust gas recirculation valve (60);

wherein the turbine wheel (28) is disposed in a turbine housing which is flowable through by the exhaust gas and is rotatable relative to the turbine housing, wherein the exhaust gas recirculation valve (60) is a flap that is disposed in an exhaust gas guide element (72) of the turbine housing that is disposed upstream of the turbine wheel (28), and wherein the flap is pivotable in a main exhaust gas flow (74) to the turbine wheel (28) such that the main exhaust gas flow (74) is adjustably dividable into a first part (76) that is directed to the turbine wheel (28) and a second part (78) that is not directed to the turbine wheel (28) and is directed to the exhaust gas recirculation circuit (52).

2. The internal combustion engine (10) according to claim 1, wherein the turbine wheel (28) is of a turbine (26) with variable turbine geometry (82).

* * * * *